US010419880B1

(12) United States Patent
Long et al.

(10) Patent No.: US 10,419,880 B1
(45) Date of Patent: Sep. 17, 2019

(54) ROBOTICS FOR INDOOR DATA CURATION

(71) Applicant: Facebook, Inc., Menlo Park, CA (US)

(72) Inventors: Xuelian Long, Lexington, MA (US); Weiyi Wu, Malden, MA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/109,541

(22) Filed: Aug. 22, 2018

(51) Int. Cl.
*H04W 4/02* (2018.01)
*H04W 4/029* (2018.01)

(52) U.S. Cl.
CPC ........... *H04W 4/023* (2013.01); *H04W 4/025* (2013.01); *H04W 4/029* (2018.02)

(58) Field of Classification Search
CPC ..... G01S 5/0252; H04W 4/029; H04W 4/043; H04W 4/33
See application file for complete search history.

(56) References Cited

U.S. PATENT DOCUMENTS

| | | | | |
|---|---|---|---|---|
| 9,301,100 | B1* | 3/2016 | Jampani | G01S 5/0278 |
| 2004/0152470 | A1* | 8/2004 | Spain | H04W 64/00 |
| | | | | 455/456.1 |
| 2006/0230332 | A1* | 10/2006 | Lin | G09B 5/06 |
| | | | | 715/203 |
| 2011/0039517 | A1* | 2/2011 | Wigren | G01S 5/0252 |
| | | | | 455/404.2 |
| 2011/0065450 | A1* | 3/2011 | Kazmi | G01S 5/0252 |
| | | | | 455/456.1 |
| 2013/0157683 | A1* | 6/2013 | Lymberopoulos | H04W 4/04 |
| | | | | 455/456.1 |
| 2014/0018095 | A1* | 1/2014 | Parvizi | H04W 4/025 |
| | | | | 455/456.1 |
| 2014/0171118 | A1* | 6/2014 | Marti | G01S 5/0252 |
| | | | | 455/456.3 |
| 2014/0179341 | A1* | 6/2014 | Sydir | H04W 64/00 |
| | | | | 455/456.1 |
| 2014/0213294 | A1* | 7/2014 | Marti | G01S 5/0252 |
| | | | | 455/456.2 |
| 2014/0350834 | A1* | 11/2014 | Turk | B60R 1/00 |
| | | | | 701/300 |
| 2015/0133149 | A1* | 5/2015 | Kim | H04W 64/00 |
| | | | | 455/456.1 |
| 2016/0316342 | A1* | 10/2016 | Narasimhan | H04B 17/318 |
| 2018/0302751 | A1* | 10/2018 | Coutinho | H04W 4/023 |
| 2018/0348333 | A1* | 12/2018 | Bhatti | G01S 5/0252 |
| 2018/0352379 | A1* | 12/2018 | Kong | H04W 4/029 |

* cited by examiner

*Primary Examiner* — Dung Hong
(74) *Attorney, Agent, or Firm* — Baker Botts L.L.P.

(57) ABSTRACT

Particular embodiments of a mobile device periodically detect signals transmitted by multiple fixed-location signal sources within a bounded area. A signal-location mapping is created based on the detected signals and their signal strength levels at the relative positions of the mobile computing device within the bounded area. The signal-location mapping may be created by generating a spatial distribution of signal strengths throughout the bounded area. Once the signal-location mapping has been created, particular embodiments may identify a relative position of a second mobile computing device with respect to the environment using the map of spatial distribution of signal strengths in accordance with a detected second spatial distribution of signal strengths.

20 Claims, 8 Drawing Sheets

ROBOTICS FOR INDOOR DATA CURATION

TECHNICAL FIELD

This disclosure generally relates to location tracking, and in particular to systems and methods for location tracking using a mobile device.

BACKGROUND

A mobile computing device, such as a smartphone, tablet computer, or laptop computer, may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

Embodiments described herein relate to systems and methods of tracking locations using a mobile device. Particular embodiments may provide a plurality of fixed-location signal sources transmitting signals within a bounded area. In particular embodiments, the mobile device may begin traversing the space within the bounded area in order to sample signals at various locations within the space. The mobile device may be, by way of example and not limitation, a smartphone or other computing device carried by a human or a vehicle, or it may be, by way of example and not limitation, incorporated into a robot or other intelligent vehicle.

In particular embodiments, the mobile device may sample signals from the signal sources in order to map the detectable signals and the signal strength (e.g., relative received signal strength indication (RSSI)) values of those signals at different locations on the area map. In other embodiments, the mobile device may operate in conjunction with other devices (e.g., crowdsourcing information collected by other mobile devices) to sample the signals. After creating such a signal-location mapping corresponding to the area map, the system may be able to use the signal-location mapping information to identify the mobile device's location within the bounded area.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, may be claimed in another claim category, e.g. system, as well. The dependencies or references back in the attached claims are chosen for formal reasons only. However, any subject matter resulting from a deliberate reference back to any previous claims (in particular multiple dependencies) may be claimed as well so that any combination of claims and the features thereof are disclosed and may be claimed regardless of the dependencies chosen in the attached claims. The subject-matter which may be claimed comprises not only the combinations of features as set out in the attached claims but also any other combination of features in the claims, wherein each feature mentioned in the claims may be combined with any other feature or combination of other features in the claims. Furthermore, any of the embodiments and features described or depicted herein may be claimed in a separate claim and/or in any combination with any embodiment or feature described or depicted herein or with any of the features of the attached claims.

DESCRIPTION OF EXAMPLE EMBODIMENTS

Figure 1A:
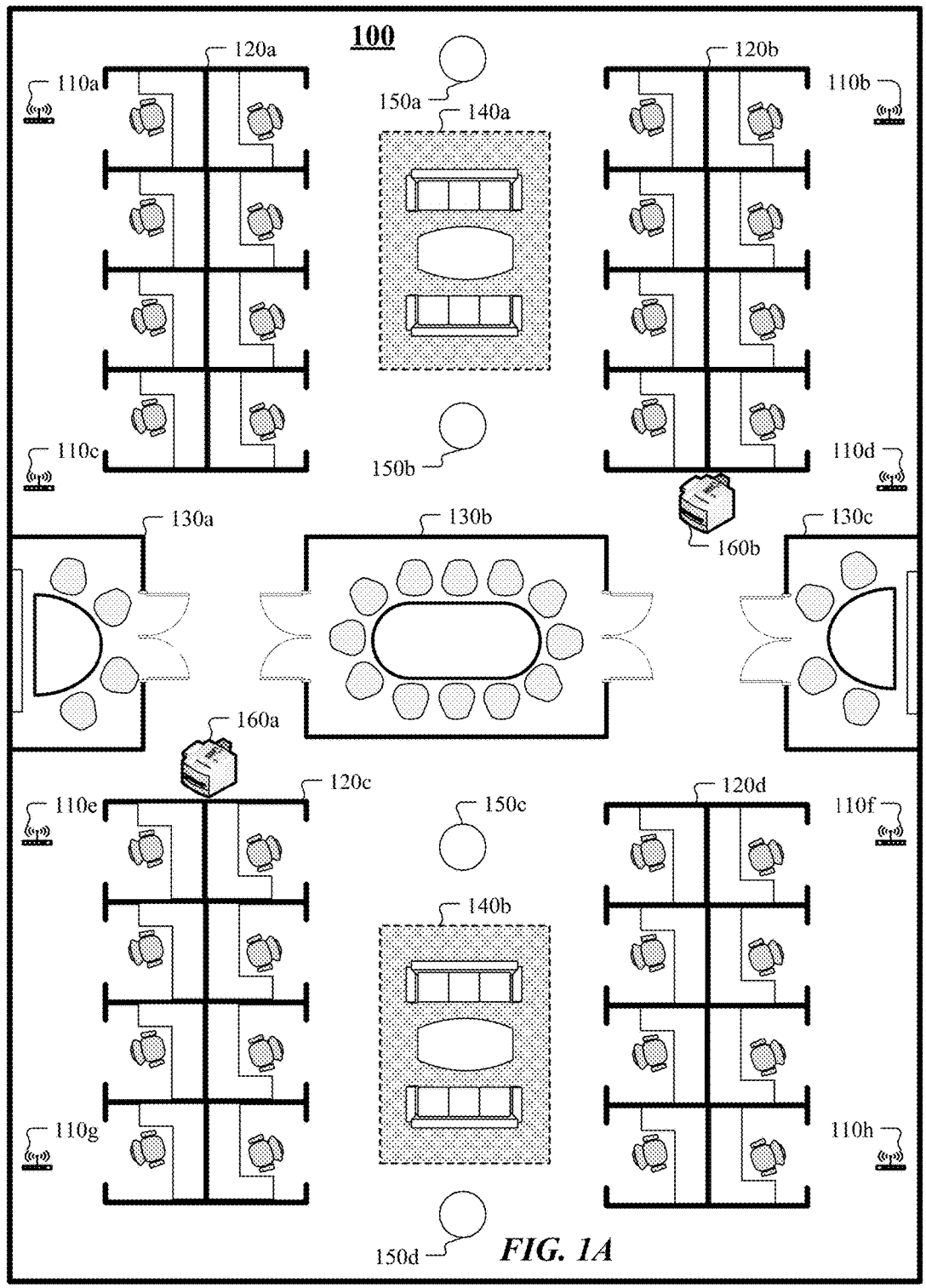
FIG. 1A illustrates an example environment for creating a signal map, including a bounded area, as well as barriers and obstructions within the space enclosed by the bounded area.

When attempting to determine a location of a mobile device, GPS signals may be inaccessible from within certain environments (e.g., indoors or underground). In these cases, determining and tracking positions of a mobile device within a bounded area (e.g., office building, shopping mall, school, amusement park) may be performed using a local area network (LAN), wherein the local area network may comprise a plurality of fixed-location signal sources, or access points (APs), such as, by way of example and not limitation, 802.11a/b/g/n Wi-Fi routers. Rather than or in addition to using a LAN, particular embodiments may utilize BLUETOOTH beacons, other BLUETOOTH Low Energy (BLE) devices, or RFID devices to determine and track positions of a mobile device. The APs may be bi-directional communication ports for the mobile devices to communicate with the local area network, wherein the APs may be configured to receive signals from the mobile devices or transmit signals to mobile devices in the local area network.

In particular embodiments, the mobile device may begin traversing the space within the bounded area in order to sample signals at various locations within the space. Depending on the distance from the mobile device to the signal sources, the strengths of the detected signals may vary. In particular embodiments, the mobile device may utilize the sampled signals in order to map the detectable signals and the strengths of those signals at different locations on the area map. In particular embodiments, as the mobile device traverses the bounded area, it may periodically scan for detectable signals every five seconds.

The mobile device may be, by way of example and not limitation, a smartphone or other computing device carried by a human or a vehicle, or it may be, by way of example and not limitation, a robot that can walk, roll, or fly through the space while sampling signals. In particular embodiments, the mobile device may be placed at a starting location within the bounded area and simply proceed to explore the space until it determines that all or most of the traverse-able space within the bounded area has been covered.

In particular embodiments, the mobile device may be provided with a pre-defined area map of the bounded area, including locations of the signal sources, the outer bounds, barriers (e.g., walls, windows, drop-offs at the top of stairs). In particular embodiments, the mobile device may begin traversing the space without any pre-defined map of the bounded area, and by tracking its direction, orientation, and distance traveled as it proceeds, thereby generate an area map of the bounded area. In some embodiments, the area map (either as pre-defined or as generated by the mobile device) may also include locations of obstructions (e.g., doors, furniture, garbage cans, floor-standing signs, chandeliers, appliances, pet food/water bowls). In particular embodiments, the area map may include metadata for each of the barriers and/or obstructions providing further information regarding dimensions, shape, location, whether the barrier and/or obstruction is temporary or permanent, whether it has moving parts, and whether it is changeable in shape or dimension. In particular embodiments, the area map may be a two-dimensional (2D) map; in other embodiments, the area map may be a three-dimensional (3D) map.

In particular embodiments where the location of the signal sources is not pre-defined, by detecting the location(s) on the area map where the strength of a particular detected signal is strongest, the mobile device may be able to determine a location of the source of the particular detected signal. In particular embodiments, the location of a signal source may be determined through triangulation using data regarding a detected signal and the signal strength values as sampled at various locations.

In particular embodiment, motion sensors of the mobile device may detect motion signals of the mobile device. The motion sensors may include an accelerometer, a compass, an altimeter, a gyroscope, odometer, or any other sensors may sense the mobile device's movement. For example, the gyroscope may determine the orientation of the mobile device and measure the change in orientation (e.g., rate of rotation.) The accelerometer may measure non-gravitational acceleration of the mobile device. Particular embodiments may combine the motion information detected or measured by the motion sensors together with images captured by a camera of the mobile device, and the system may thereby be able to determine the mobile device's orientation and movement precisely and further calibrate the mobile device's motion and location more accurately.

In particular embodiments, the systems and the methods may use image data captured by a camera (e.g., a smartphone's build-in camera) to obtain location and space information about the surroundings or the orientation of the mobile device by analyzing the images. By analyzing the captured images, the angles of capturing the images, or the sequence of capturing the images, the system may determine the mobile device's orientation and movement, such as moving forward/backward, or turning right/left, etc. Location and space information may be obtained by analyzing the orientation and movement data, and the system may create a signal-location mapping by generating a spatial distribution of the detected signals based on their respective signal strength values. In particular embodiments, the spatial distribution of signal strength values may be weighted in accordance with physical attributes of the mobile computing device (e.g., networking capabilities).

In particular embodiments, systems and methods may use the image data (e.g., captured images or videos) and motion data (e.g., movement or orientations) detected by motion sensors of the smartphone to obtain spatial information about the environment and more accurately detect orientation or movement. The image data may be analyzed as described above. Additionally, the system may determine movement and orientation more accurately by analyzing the motion data, such as the mobile device's orientation, speed, or altitude. Combined with the image data, the system may determine orientation or movement more precisely, wherein the orientation may be detected by a gyroscope or the acceleration may be detected by an accelerometer. The space information obtained by analyzing the images and the motion data may be more accurate than by analyzing the images only. Locations may be identified more precisely with the support of the image data and the motion data. The identified location then may be correlated with the detected spatial distribution of signal strength values, and a map of the spatial distribution of signal strengths with respect to the detected spatial distribution of signal strength values may be generated and saved on a server of the system. In particular embodiments, the mobile device or a vehicle (e.g., robot) carrying the mobile device may also utilize LiDAR to measure distance to different targets as the space is traversed. Such LiDAR information may be used in conjunction with the image data, information collected by the motion sensors, and any other information collected as the space is traversed.

In some embodiments, as the signals are sampled, the signal-location mapping and/or the area map may be generated on the mobile device. In some embodiments, as the signals are sampled, information about the sampled signals may be transmitted to a server, and the signal-location mapping and/or the area map may be constructed on the server. The constructed signal-location mapping and the area map may then be uploaded to a shared data store, where it may be utilized in applications, by way of example and not limitation, that: provide a visual map of the bounded area, provide navigation information within the bounded area, provide recommendations regarding placement (e.g., for furniture, fixtures, attractions, decorations), place signs to direct pedestrian traffic. In particular embodiments, the area map may be incorporated into the signal map.

Using the signal map, the systems may precisely identify the mobile device's location. Upon receiving a location request, the mobile device may identify its location by sampling detectable signals and their strengths at its current location, then identifying the location using the signal-location mapping at which each of the detected signal was determined to have a matching strength at the level noted for that location. After sampling the detected signals and their respective signal strength values at each of the sampling locations, the mobile device may generate a spatial distribution of signals and their respective signal strength values by interpolating signal strength values for each of the signals detected within the bounded area between the sampling locations themselves, as well as between the determined locations of the signal sources and the sampling locations. In particular embodiments, the mobile device may collect signal information and send the information to a server to determine the interpolated signal strength values and the spatial distribution of signals. Particular embodiments may interpolate signal strength values between adjacent sampling locations for signals detected at one or more of the adjacent sampling locations. Particular embodiments may interpolate signal strength values between the determined location of the signal source for a given detected signal and its nearest sampling locations. Particular embodiments may subsequently apply a smoothing algorithm with respect to the signal strength values across some or all of the sampling locations.

Once the signal-location mapping is created, the map may be further refined and updated with subsequently collected spatial distribution of signal strengths from other mobile devices (e.g., human carrying mobile devices). The signal-location mapping may be accessed by a subsequent user of the system. The subsequent user's mobile device may detect signal data by scanning the APs in the same environment on a periodic basis. Based on the spatial distribution of signal strengths detected by the subsequent user's mobile device, the system may precisely identify the corresponding user's location using the map of spatial distribution of signal strengths.

Meanwhile, the signal-location mapping may be further refined or updated by crowdsourcing the collection of signal data. The spatial distribution of signal strengths newly detected by subsequent users' mobile devices visiting the same area over a certain period of time may be used to fill gaps in the map or to refine the map by interpolating with existing distributions of signal strengths. Particular embodiments may expire a signal from the signal-location mapping when the signal is not detected by any user client device for a predetermined duration of time. Particular embodiments may then restore the expired signal in the signal-location mapping when and if the signal is subsequently detected by a user client device.

Figure 1B:
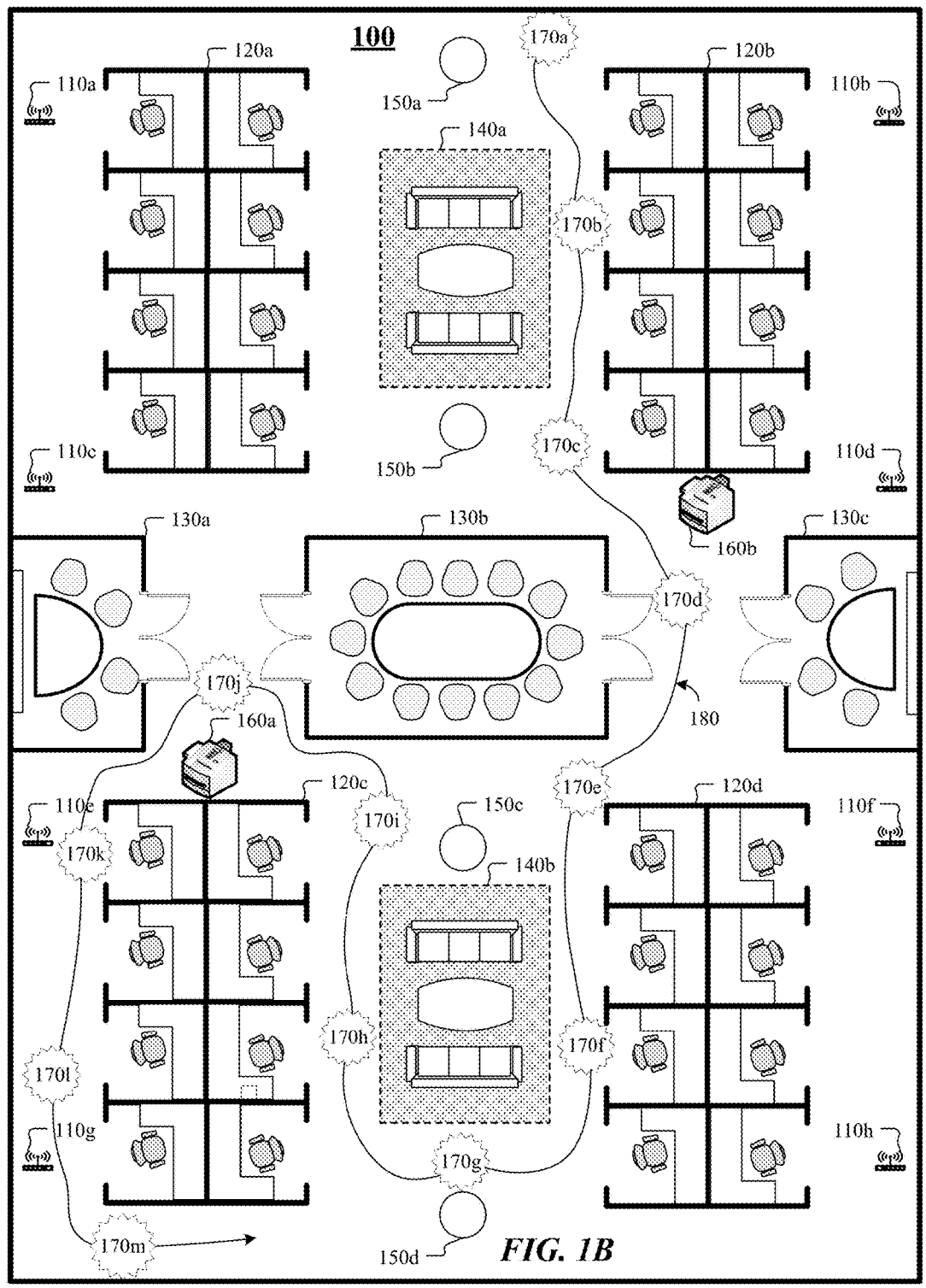
FIG. 1B illustrates the path of a mobile device while sampling signals and traversing the space enclosed by the bounded area illustrated in the example environment of FIG. 1A.
Figure 1C:
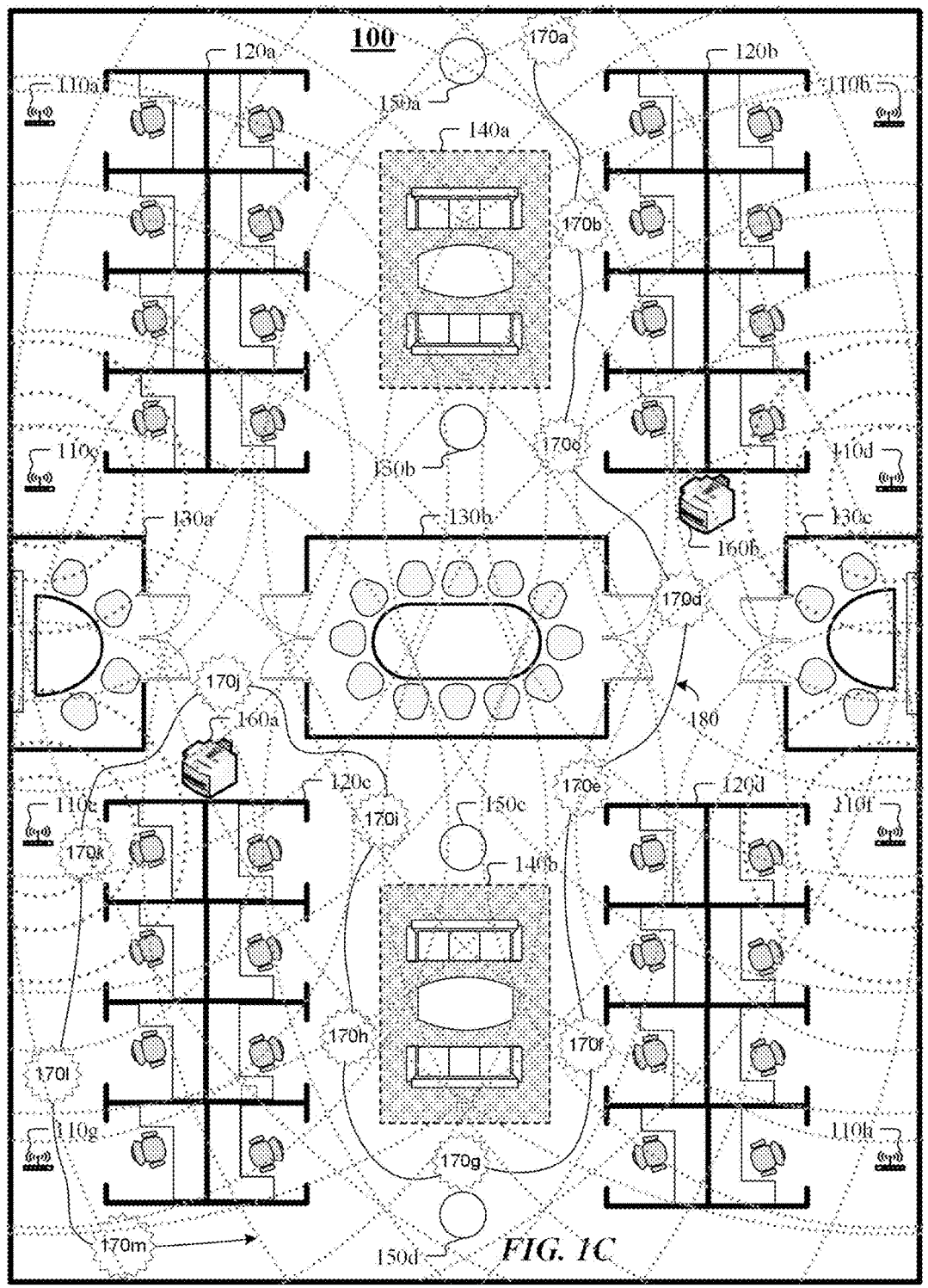
FIG. 1C illustrates the example signals that can be detected at each location at which signals are sampled in the example environment of FIG. 1A.

FIGS. 1A-1C illustrate an example environment for creating a signal-location mapping in particular embodiments. FIG. 1A illustrates a bounded area, as well as barriers and obstructions within the space enclosed by the bounded area. The area map may comprise a plurality of access points (APs) including APs 110a, 110b, 110c, 110d, 110e, 110f, 110g, and 110h (each mounted on the wall, 9 feet above the floor) wherein the APs may transmit wireless signals continuously. In particular embodiments, a robot with a mobile device (e.g., a smartphone) may activate a location tracking system upon entering the space. As the robot traverses the space, it may become necessary to navigate around the cubicle blocks (120a, 120b, 120c, and 120d), the videoconference/teleconference rooms (130a, 130b, and 130c), the casual meeting areas (140a and 140b), the support pillars (150a, 150b, 150c, and 150d), and the printer/fax/scanner machines (160a and 160b).

Figure 1D:
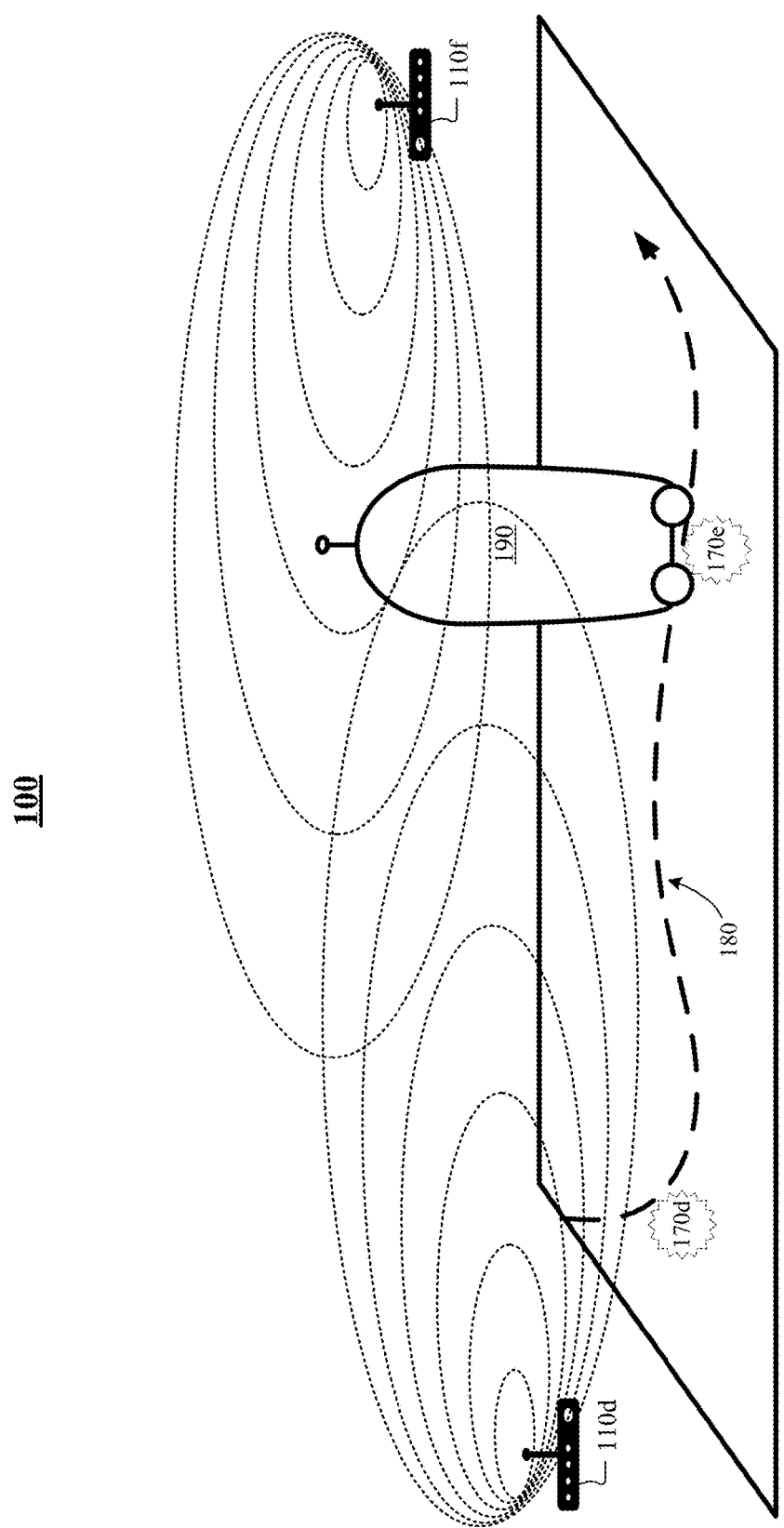
FIG. 1D illustrates an example robot traversing the bounded area to sample signals in the example environment of FIG. 1A.

As shown in FIG. 1B, the mobile device may sample the signals transmitted from APs 110a-h periodically at a plurality of sampling locations 170a-170m along path 180. At each of the sampling locations, signals may be detected, and distribution of signal strengths may be collected. A spatial distribution of signal strengths may be formed with respect to the collected distribution of signal strengths. FIG. 1C illustrates the example signals that can be detected at each location at which signals are sampled (for the sake of clarity of illustration, only signals transmitted by APs 110c, 110d, 110e, and 110f are explicitly depicted). FIG. 1D illustrates an example robot 190 traversing the bounded area to sample signals in the example environment of FIG. 1A. As can be seen in FIG. 1D, robot 190 is moving further away from AP 110d and closer to AP 110f; in fact, as robot 190 proceeds further along path 180, it will eventually move far enough away from AP 110d that the signal from AP 110d is no longer detectable.

In particular embodiments, the mobile device may sample any detectable signals periodically (e.g., every five seconds) from the APs 110a-h at each sampling location 170a-m as shown in FIG. 1C. The mobile device may then store, for each sampling location 170a-m, the list of signals detected at that location and the signal strength values for each of the detected signals.

In some examples, after starting off at sampling location 170a, every five seconds, the robot may proceed to the next sampling location. As the robot proceeds from one sampling location 170 to the next, the signals from APs 110a-h that are detectable and their respective signal strength values may vary. Table 1 below illustrates an example set of signal data collected at three of the sampling locations 170 ("n/d": signal not detectable at this sampling location).

TABLE 1

Measured signal strength for each AP 110 at a given sampling location 170.

| Location | 110a | 110b | 110c | 110d | 110e | 110f | 110g | 110h |
|---|---|---|---|---|---|---|---|---|
| 170a | −91 | −79 | −97 | −88 | −110 | −109 | n/d | n/d |
| 170d | −109 | −72 | −92 | −59 | −97 | −73 | −108 | −81 |
| 170k | −99 | n/d | −82 | −109 | −30 | −109 | −62 | −106 |

In particular embodiments, in addition to sampling AP signals, the mobile device may obtain signals detected by various sensors of the mobile device. The system may also analyze the detected sensor signals and track the mobile device's movement and orientation with a high degree of accuracy. The sensors may comprise camera sensors and motion sensors including an accelerometer, a compass, an altimeter, a gyroscope, or any other sensors may sense the mobile device's movement. Among the various sensors, the gyroscope and the accelerometer may be sensors that can detect data indicating the mobile device's orientation and acceleration, respectively. The gyroscope may detect the orientation of the mobile device and measure the change of orientation (e.g., rate of rotation.) The accelerometer may measure non-gravitational acceleration of the mobile device. By combining the information detected or measured by the gyroscope and accelerometer, the system may be able to determine the mobile device's orientation and movement precisely and identify the mobile device's location accurately.

For example, and with reference to FIGS. 1B and 1C, at the sampling location 170h, the accelerometer may detect that the acceleration is zero and the gyroscope may measure the rate of rotation is eighty degrees to the left. The system may determine that the mobile device stops and turns left eighty degrees at the sampling location 170h by analyzing the detected motion data. The system may also determine the distance between sampling location 170h and sampling location 170e, based on the travel time (e.g., twenty seconds), acceleration, and the degree of rotation (e.g., about 180-degree rotation) of the mobile device between the sampling location 170h and sampling location 170e. The motion sensors may detect the robot's direction of motion (e.g., forward or backward), and the system may detect when the robot approaches/leaves the casual meeting area 140b accordingly. When the robot traverses the entire space, the system may map the entire environment 100 into a 2D or 3D area map, and the precise space information may be integrated in the map.

By utilizing the collected data regarding detectable signals and signal strengths, as well as the motion data, the system may create a detailed and precise signal-location mapping and identify the relative locations of the user in the environment 100 more accurately. The map may be refined or updated with subsequently detected signal data.

For example, as shown in FIG. 1B, the robot traverses along the path 180 shown in dashed line but does not enter casual meeting area 140b. Subsequently, a user with a second mobile device may walk down to the casual meeting area 140b along the route 180. The images captured by the user (e.g., using a camera of the second mobile device) may have more detail than the images captured by the robot, and the casual meeting area 140b may be mapped more accurately based on analyzing the image data captured by the user in conjunction with any images of casual meeting area 140b that may have been captured by the robot. The second mobile device may scan signal strengths at the locations shown in FIG. 1B including the sampling locations 170b and 170i, and the signal-location mapping may be updated with the data collected by the user. At the sampling location 170k, the signal strength collected from the AP 110e is the strongest, the signal strength collected from the AP 110c is weaker, and signal strengths collected from the AP 110a and AP 110b are the weakest. The updated signal-location mapping may be saved in the system and may be used to identify locations or further be updated by subsequent detected data.

In particular embodiments, the altimeter of the mobile device may detect the altitude changes. For example, the system may determine that the user with the second mobile device is going up to the second floor based on the altitude detected by the altimeter. By knowing that the user is at the second floor, the system may be able to map the environment of the second floor accordingly. Similarly, at each floor of the space, the environment 100 may be mapped accurately, and a corresponding signal-location mapping may be created accordingly. Thus, the system described herein may map the particular environment more precisely and the accuracy of location identification may be significantly improved.

In particular embodiments, when no signal can be detected from a particular access point (e.g., AP 110d) for a while, that AP may be expired from the map of spatial distribution of signal strengths. The expired AP may then be restored back to the signal-location mapping when the signal from the expired AP 11d is re-detected by a mobile device. In particular embodiments, one or more of the access points 110a-h may be relocated. The new locations information of the access points 110a-h may be updated on the signal-location mapping along with the new scan signal data.

In particular embodiments, by tracking the relative locations of multiple users in the environment, the system may monitor the traffic within the environment. For example, the system may be able to determine a particular location as a "hotspot" when more users are identified nearby the particular location. The system may provide this traffic information to the users, such as showing a virtual "hotspot" at the particular location for display to the users. Additionally, the virtual path created by the system leading the users to the particular location may be alternated to avoid the traffic, or the user may decide to change his destination to avoid or to follow the "hotspot".

In particular embodiments, the systems and methods described above may be installed in an indoor environment, such as a shopping mall, or may be installed in a bounded outdoor area, such as an outdoor amusement park. The accuracy of the location identification may be affected by various factors including, but not limited to, the number of the users accessing the system, the number of the access points installed in the environment, location of the access points, the frequency of sampling signals, the device configurations, the system bandwidth, or the configuration of computation devices of the system for processing the data.

Figure 2:
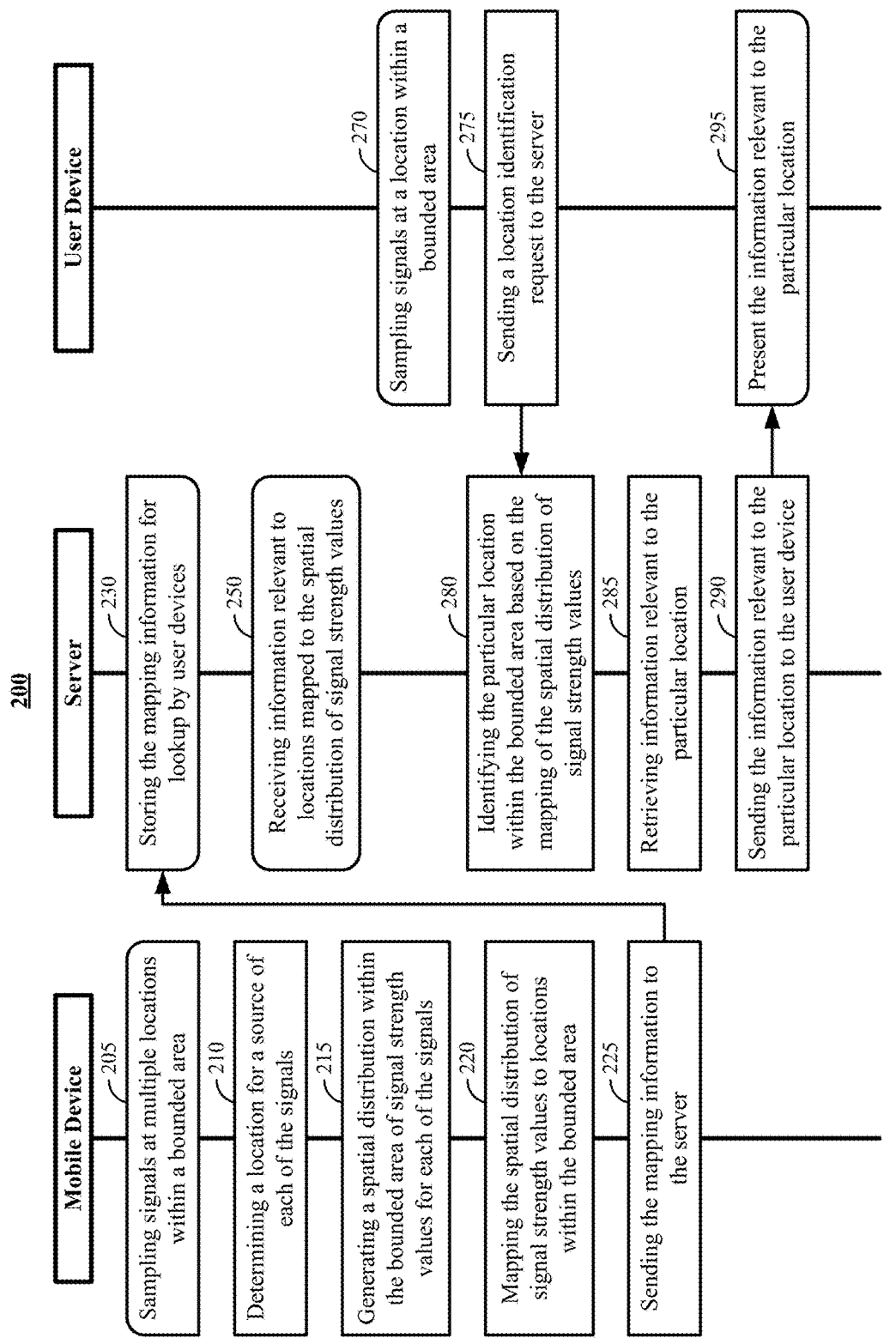
FIG. 2 illustrates an example method of creating a signal-location mapping in particular embodiments.

FIG. 2 illustrates an example method for creating and using a signal-location mapping in particular embodiments. The method 200 may begin at step 205, where a mobile computing device (e.g., a smartphone) traverses a bounded area while sampling signals transmitted by a plurality of fixed-location signal sources (e.g., access points) within the bounded area. Depending on the location the mobile device within the bounded area, values for the strengths of the signals may vary, and the signals may even become undetectable at particular locations. The closer the mobile computing device moves toward a particular signal source, the higher signal strength values may be detected (depending of course, upon intervening barriers and/or obstructions). At step 210, a location may be determined for each of the detected signal sources. In particular embodiments, step 210 may occur concurrently with step 205 or following step 205.

At step 215, a spatial distribution of signal strength values may be generated for the bounded area with respect to the locations of the signal sources. The spatial distribution of signal strengths may be generated by interpolating the signal strength values between the sampling locations. At step 220, the spatial distribution of signal strength values may be mapped to locations within the bounded area, after which the mapping information may be sent to a server and stored (step 230) for lookup by user client devices. In particular embodiments, the mobile device may send the sampling information to the server, and steps 210, 215, and 220 may be performed by the server. In particular embodiments, the mapping information may be periodically updated by the server (e.g., by collecting crowdsourced signal information sampled by user client devices moving within the bounded area).

At step 250, the server may receive information relevant to locations mapped to the spatial distribution of signal strength values. Such information may include information such as identification information for structures, barriers, and obstructions within the bounded area (e.g., southwest wall, escalator, coffee table, smartphone case kiosk), content related to entities associated with a location or structure within the bounded area (e.g., coupons for a store within a mall, reading assignments related to a class taught in a particular classroom, a menu for a restaurant), personalized social graph information (e.g., "Five of your friends purchased clothing or accessories for Coachella from this location of Forever 21!" or "Eight of your friends dined at this restaurant in the past two weeks!"), or accessibility or amenities information (e.g., distance to the closest elevator, wheelchair accessibility, whether a restroom is open or closed for service, whether a restaurant accepts cash only). In particular embodiments, the information received in step 250 may be indexed for quick retrieval based on the mapping of the spatial distribution of signal strength values to locations within the bounded area.

At step 270, a user client device may sample signals at a particular location within the bounded area. After collecting signal strength values from signals detectable at the particular location, the user client device may send a location identification request to the server at step 275. Upon receiving the location identification request, at step 280, the server may identify the particular location within the bounded area by using the mapping of the spatial distribution of signal strength values to determine where the user client device is located based on the detected signals. At step 285, the server may then retrieve information relevant to the particular location, and then send the information relevant to the particular location to the user client device at step 290. Finally, at step 295, the user client device may present the information relevant to the identified particular location.

Figure 3:
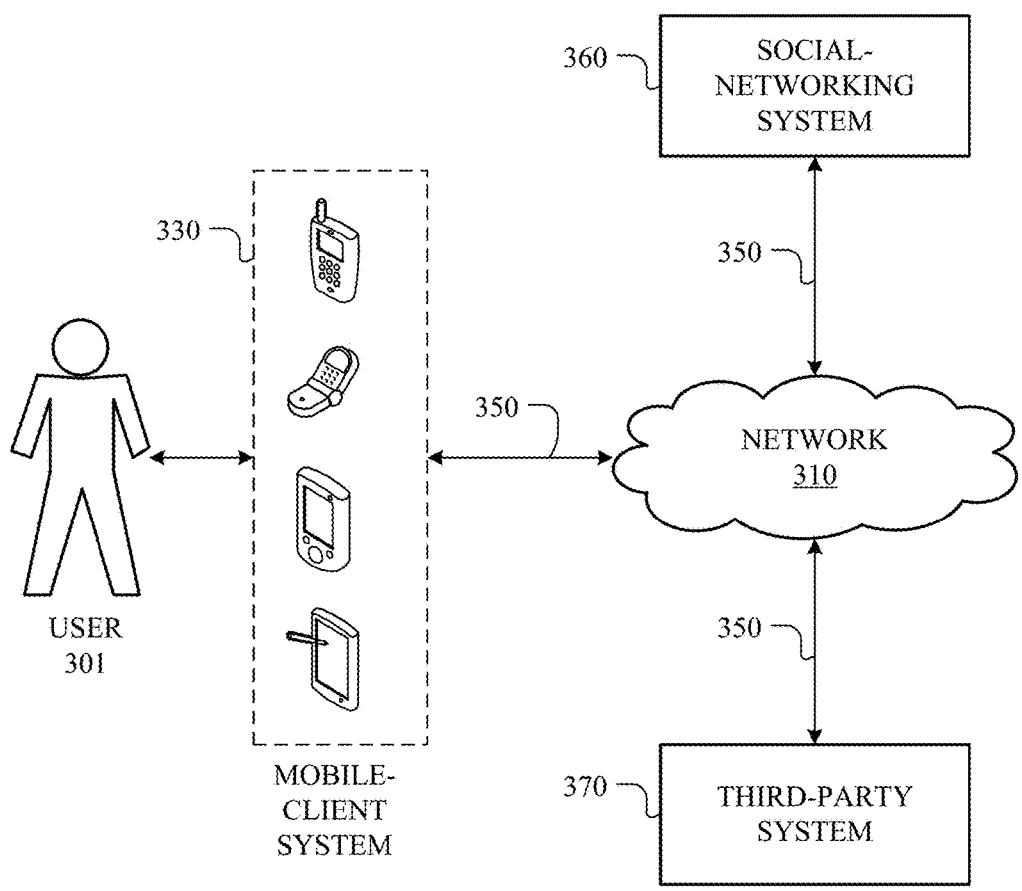
FIG. 3 illustrates an example network environment associated with a social-networking system in particular embodiments.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates an example method for creating and using a signal-location mapping including the particular steps of the method of FIG. 2, this disclosure contemplates any suitable method for creating and using a signal mapping, including any suitable steps, which may include all, some, or none of the steps of the method of FIG. 2, where appropriate. Furthermore, although this disclosure describes and illustrates particular components, devices, or systems carrying out particular steps of the method of FIG. 2, this disclosure contemplates any suitable combination of any FIG. 3 illustrates an example network environment 300 associated with a social-networking system in particular embodiments. Network environment 300 includes a user 301, a client system 330, a social-networking system 360, and a third-party system 370 connected to each other by a network 310. Although FIG. 3 illustrates a particular arrangement of user 301, client system 330, social-networking system 360, third-party system 370, and network 310, this disclosure contemplates any suitable arrangement of user 301, client system 330, social-networking system 360, third-party system 370, and network 310. As an example and not by way of limitation, two or more of client system 330, social-networking system 360, and third-party system 370 may be connected to each other directly, bypassing network 310. As another example, two or more of client system 330, social-networking system 360, and third-party system 370 may be physically or logically co-located with each other in whole or in part. Moreover, although FIG. 3 illustrates a particular number of users 301, client systems 330, social-networking systems 360, third-party systems 370, and networks 310, this disclosure contemplates any suitable number of users 301, client systems 330, social-networking systems 360, third-party systems 370, and networks 310. As an example and not by way of limitation, network environment 300 may include multiple users 301, client system 330, social-networking systems 360, third-party systems 370, and networks 310.

In particular embodiments, user 301 may be an individual (human user), an entity (e.g., an enterprise, business, or third-party application), or a group (e.g., of individuals or entities) that interacts or communicates with or over social-networking system 360. In particular embodiments, social-networking system 360 may be a network-addressable computing system hosting an online social network. Social-networking system 360 may generate, store, receive, and send social-networking data, such as, for example, user-profile data, concept-profile data, social-graph information, or other suitable data related to the online social network. Social-networking system 360 may be accessed by the other components of network environment 300 either directly or via network 310. In particular embodiments, social-networking system 360 may include an authorization server (or other suitable component(s)) that allows users 301 to opt in to or opt out of having their actions logged by social-networking system 360 or shared with other systems (e.g., third-party systems 370), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 360 through blocking, data hashing, anonymization, or other suitable techniques as appropriate. In particular embodiments, third-party system 370 may be a network-addressable computing system. Third-party system 370 may generate, store, receive, and send content items, such as, for example, text, images, video, or any other content item. Third-party system 370 may be accessed by the other components of network environment 300 either directly or via network 310. In particular embodiments, one or more users 301 may use one or more client systems 330 to access, send data to, and receive data from social-networking system 360 or third-party system 370. Client system 330 may access social-networking system 360 or third-party system 370 directly, via network 310, or via a third-party system. As an example and not by way of limitation, client system 330 may access third-party system 370 via social-networking system 360. Client system 330 may be any suitable computing device, such as, for example, a personal computer, a laptop computer, a cellular telephone, a smartphone, a tablet computer, or an augmented/virtual reality device.

This disclosure contemplates any suitable network 310. As an example and not by way of limitation, one or more portions of network 310 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 310 may include one or more networks 310.

Links 350 may connect client system 330, social-networking system 360, and third-party system 370 to communication network 310 or to each other. This disclosure contemplates any suitable links 350. In particular embodiments, one or more links 350 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 350 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 350, or a combination of two or more such links 350. Links 350 need not necessarily be the same throughout network environment 300. One or more first links 350 may differ in one or more respects from one or more second links 350.

Figure 4:
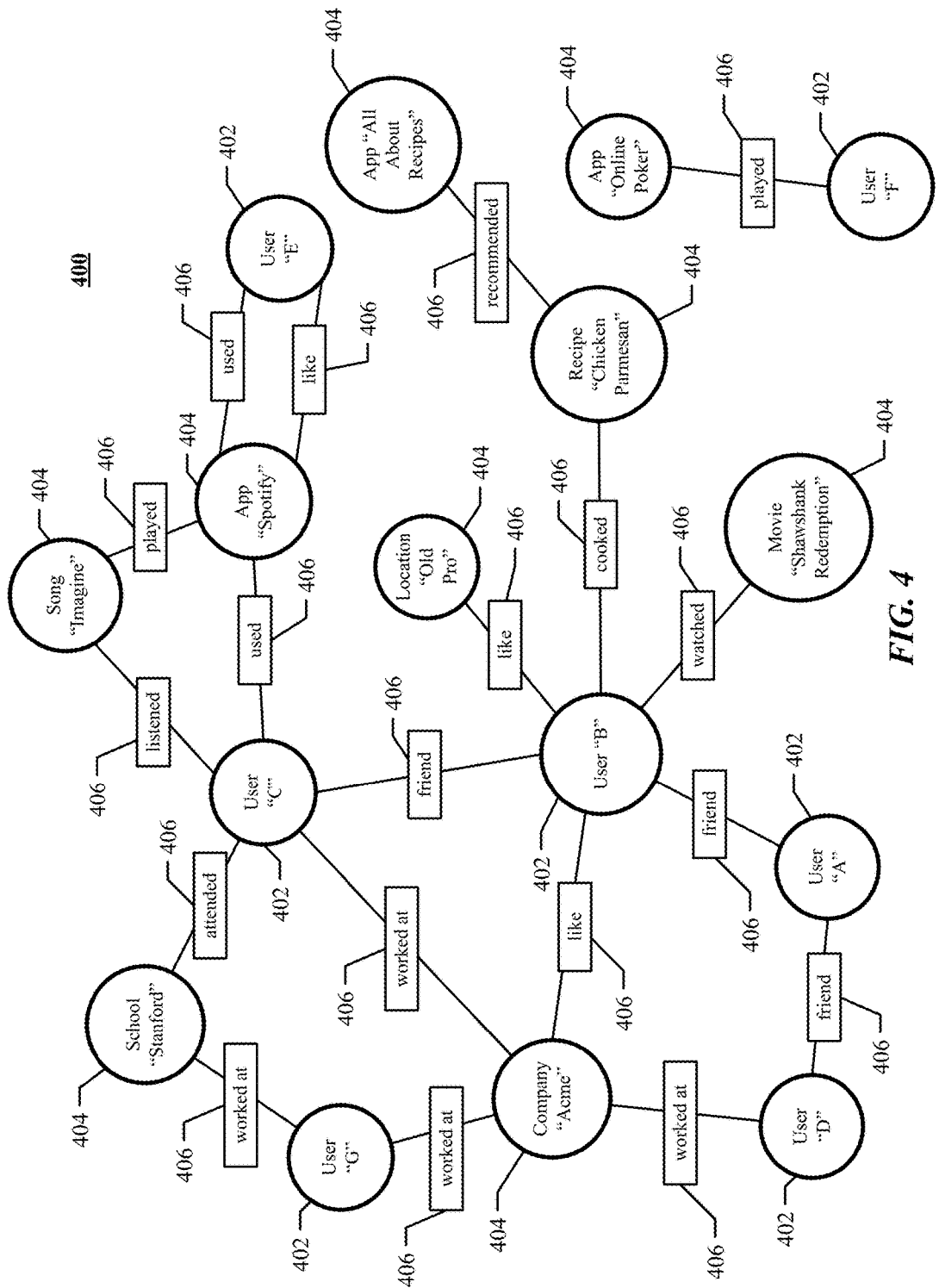
FIG. 4 illustrates an example social graph in particular embodiments.

FIG. 4 illustrates example social graph 400 in particular embodiments. In particular embodiments, social-networking system 360 may store one or more social graphs 400 in one or more data stores. In particular embodiments, social graph 400 may include multiple nodes—which may include multiple user nodes 402 or multiple concept nodes 404—and multiple edges 406 connecting the nodes. Example social graph 400 illustrated in FIG. 4 is shown, for didactic purposes, in a two-dimensional visual map representation. In particular embodiments, a social-networking system 360, client system 330, or third-party system 370 may access social graph 400 and related social-graph information for suitable applications. The nodes and edges of social graph 400 may be stored as data objects, for example, in a data store (such as a social-graph database). Such a data store may include one or more searchable or queryable indexes of nodes or edges of social graph 400.

In particular embodiments, a user node 402 may correspond to a user of social-networking system 360. As an example and not by way of limitation, a user may be an individual (human user), an entity (e.g., an enterprise, business, or third-party application), or a group (e.g., of individuals or entities) that interacts or communicates with or over social-networking system 360. In particular embodiments, when a user registers for an account with social-networking system 360, social-networking system 360 may create a user node 402 corresponding to the user and store the user node 402 in one or more data stores. Users and user nodes 402 described herein may, where appropriate, refer to registered users and user nodes 402 associated with registered users. In addition or as an alternative, users and user nodes 402 described herein may, where appropriate, refer to users that have not registered with social-networking system 360. In particular embodiments, a user node 402 may be associated with information provided by a user or information gathered by various systems, including social-networking system 360. As an example and not by way of limitation, a user may provide his or her name, profile picture, contact information, birth date, sex, marital status, family status, employment, education background, preferences, interests, or other demographic information. In particular embodiments, a user node 402 may be associated with one or more data objects corresponding to information associated with a user. In particular embodiments, a user node 402 may correspond to one or more webpages.

In particular embodiments, a concept node 404 may correspond to a concept. As an example and not by way of limitation, a concept may correspond to a place (such as, for example, a movie theater, restaurant, landmark, or city); a website (such as, for example, a website associated with social-network system 360 or a third-party website associated with a web-application server); an entity (such as, for example, a person, business, group, sports team, or celebrity); a resource (such as, for example, an audio file, video file, digital photo, text file, structured document, or application) which may be located within social-networking system 360 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 404 may be associated with information of a concept provided by a user or information gathered by various systems, including social-networking system 360. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 404 may be associated with one or more data objects corresponding to information associated with concept node 404. In particular embodiments, a concept node 404 may correspond to one or more webpages.

In particular embodiments, a node in social graph 400 may represent or be represented by a webpage (which may be referred to as a "profile page"). Profile pages may be hosted by or accessible to social-networking system 360. Profile pages may also be hosted on third-party websites associated with a third-party server 370. As an example and not by way of limitation, a profile page corresponding to a particular external webpage may be the particular external webpage and the profile page may correspond to a particular concept node 404. Profile pages may be viewable by all or a selected subset of other users. As an example and not by way of limitation, a user node 402 may have a corresponding user-profile page in which the corresponding user may add content, make declarations, or otherwise express himself or herself. As another example and not by way of limitation, a concept node 404 may have a corresponding concept-profile page in which one or more users may add content, make declarations, or express themselves, particularly in relation to the concept corresponding to concept node 404.

In particular embodiments, a concept node 404 may represent a third-party webpage or resource hosted by a third-party system 370. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 330 to send to social-networking system 360 a message indicating the user's action. In response to the message, social-networking system 360 may create an edge (e.g., a check-in-type edge) between a user node 402 corresponding to the user and a concept node 404 corresponding to the third-party webpage or resource and store edge 406 in one or more data stores.

In particular embodiments, a pair of nodes in social graph 400 may be connected to each other by one or more edges 406. An edge 406 connecting a pair of nodes may represent a relationship between the pair of nodes. In particular embodiments, an edge 406 may include or represent one or more data objects or attributes corresponding to the relationship between a pair of nodes. As an example and not by way of limitation, a first user may indicate that a user is a "friend" of the first user. In response to this indication, social-networking system 360 may send a "friend request" to the user. If the user confirms the "friend request," social-networking system 360 may create an edge 406 connecting the first user's user node 402 to the user's user node 402 in social graph 400 and store edge 406 as social-graph information in one or more data stores. In the example of FIG. 4, social graph 400 includes an edge 406 indicating a friend relation between user nodes 402 of user "A" and user "B" and an edge indicating a friend relation between user nodes 402 of user "C" and user "B."

Although this disclosure describes or illustrates particular edges 406 with particular attributes connecting particular user nodes 402, this disclosure contemplates any suitable edges 406 with any suitable attributes connecting user nodes 402. As an example and not by way of limitation, an edge 406 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 400 by one or more edges 406.

In particular embodiments, an edge 406 between a user node 402 and a concept node 404 may represent a particular action or activity performed by a user associated with user node 402 toward a concept associated with a concept node 404. As an example and not by way of limitation, as illustrated in FIG. 4, a user may "like," "attended," "played," "listened," "cooked," "worked at," or "watched" a concept, each of which may correspond to an edge type or subtype. A concept-profile page corresponding to a concept node 404 may include, for example, a selectable "check in" icon (such as, for example, a clickable "check in" icon) or a selectable "add to favorites" icon. Similarly, after a user clicks these icons, social-networking system 360 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 360 may create a "listened" edge 406 and a "used" edge (as illustrated in FIG. 4) between user nodes 402 corresponding to the user and concept nodes 404 corresponding to the song and application to indicate that the user listened to the song and used the application. Moreover, social-networking system 360 may create a "played" edge 406 (as illustrated in FIG. 4) between concept nodes 404 corresponding to the song and the application to indicate that the particular song was played by the particular application. In this case, "played" edge 406 corresponds to an action performed by an external application (SPOTTY) on an external audio file (the song "Imagine"). Although this disclosure describes particular edges 406 with particular attributes connecting user nodes 402 and concept nodes 404, this disclosure contemplates any suitable edges 406 with any suitable attributes connecting user nodes 402 and concept nodes 404. Moreover, although this disclosure describes edges between a user node 402 and a concept node 404 representing a single relationship, this disclosure contemplates edges between a user node 402 and a concept node 404 representing one or more relationships. As an example and not by way of limitation, an edge 406 may represent both that a user likes and has used at a particular concept. Alternatively, another edge 406 may represent each type of relationship (or multiples of a single relationship) between a user node 402 and a concept node 404 (as illustrated in FIG. 4 between user node 402 for user "E" and concept node 404 for "SPOTIFY").

In particular embodiments, social-networking system 360 may create an edge 406 between a user node 402 and a concept node 404 in social graph 400. As an example and not by way of limitation, a user viewing a concept-profile page (such as, for example, by using a web browser or a special-purpose application hosted by the user's client system 330) may indicate that he or she likes the concept represented by the concept node 404 by clicking or selecting a "Like" icon, which may cause the user's client system 330 to send to social-networking system 360 a message indicating the user's liking of the concept associated with the concept-profile page. In response to the message, social-networking system 360 may create an edge 406 between user node 402 associated with the user and concept node 404, as illustrated by "like" edge 406 between the user and concept node 404. In particular embodiments, social-networking system 360 may store an edge 406 in one or more data stores. In particular embodiments, an edge 406 may be automatically formed by social-networking system 360 in response to a particular user action. As an example and not by way of limitation, if a first user uploads a picture, watches a movie, or listens to a song, an edge 406 may be formed between user node 402 corresponding to the first user and concept nodes 404 corresponding to those concepts. Although this disclosure describes forming particular edges 406 in particular manners, this disclosure contemplates forming any suitable edges 406 in any suitable manner.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more web pages, in one or more e-mails, or in connection with search results requested by a user. In addition or as an alternative, an advertisement may be one or more sponsored stories (e.g., a news-feed or ticker item on social-networking system 360). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. The social action may be promoted within or on social-networking system 360. In addition or as an alternative, the social action may be promoted outside or off of social-networking system 360, where appropriate. In particular embodiments, a page may be an on-line presence (such as a webpage or website within or outside of social-networking system 360) of a business, organization, or brand facilitating its sharing of stories and connecting with people. A page may be customized, for example, by adding applications, posting stories, or hosting events.

A sponsored story may be generated from stories in users' news feeds and promoted to specific areas within displays of users' web browsers when viewing a web page associated with social-networking system 360. Sponsored stories are more likely to be viewed by users, at least in part because sponsored stories generally involve interactions or suggestions by the users' friends, fan pages, or other connections. In connection with sponsored stories, particular embodiments may utilize one or more systems, components, elements, functions, methods, operations, or steps disclosed in U.S. patent application Ser. No. 13/327,557, entitled "Sponsored Stories Unit Creation from Organic Activity Stream" and filed 15 Dec. 2011, U.S. Patent Application Publication No. 2012/0203831, entitled "Sponsored Stories Unit Creation from Organic Activity Stream" and filed 3 Feb. 2012 as U.S. patent application Ser. No. 13/020,745, or U.S. Patent Application Publication No. 2012/0233009, entitled "Endorsement Subscriptions for Sponsored Stories" and filed 9 Mar. 2011 as U.S. patent application Ser. No. 13/044,506, which are all incorporated herein by reference as an example and not by way of limitation. In particular embodiments, sponsored stories may utilize computer-vision algorithms to detect products in uploaded images or photos lacking an explicit connection to an advertiser as disclosed in U.S. patent application Ser. No. 13/212,356, entitled "Computer-Vision Content Detection for Sponsored Stories" and filed 18 Aug. 2011, which is incorporated herein by reference as an example and not by way of limitation.

As described above, an advertisement may be text (which may be HTML-linked), one or more images (which may be HTML-linked), one or more videos, audio, one or more ADOBE FLASH files, a suitable combination of these, or any other suitable advertisement in any suitable digital format. In particular embodiments, an advertisement may be requested for display within third-party webpages, social-networking-system webpages, or other pages. An advertisement may be displayed in a dedicated portion of a page, such as in a banner area at the top of the page, in a column at the side of the page, in a GUI of the page, in a pop-up window, over the top of content of the page, or elsewhere with respect to the page. In addition or as an alternative, an advertisement may be displayed within an application or within a game. An advertisement may be displayed within dedicated pages, requiring the user to interact with or watch the advertisement before the user may access a page, utilize an application, or play a game. The user may, for example view the advertisement through a web browser.

A user may interact with an advertisement in any suitable manner. The user may click or otherwise select the advertisement, and the advertisement may direct the user (or a browser or other application being used by the user) to a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). In particular embodiments, an advertisement may include one or more games, which a user or other application may play in connection with the advertisement. An advertisement may include functionality for responding to a poll or question in the advertisement.

An advertisement may include social-networking-system functionality that a user may interact with. For example, an advertisement may enable a user to "like" or otherwise endorse the advertisement by selecting an icon or link associated with endorsement. Similarly, a user may share the advertisement with another user (e.g., through social-networking system 360) or RSVP (e.g., through social-networking system 360) to an event associated with the advertisement. In addition or as an alternative, an advertisement may include social-networking-system content directed to the user. For example, an advertisement may display information about a friend of the user within social-networking system 360 who has taken an action associated with the subject matter of the advertisement.

Social-networking-system functionality or content may be associated with an advertisement in any suitable manner. For example, an advertising system (which may include hardware, software, or both for receiving bids for advertisements and selecting advertisements in response) may retrieve social-networking functionality or content from social-networking system 360 and incorporate the retrieved social-networking functionality or content into the advertisement before serving the advertisement to a user. Examples of selecting and providing social-networking-system functionality or content with an advertisement are disclosed in U.S. Patent Application Publication No. 2012/0084160, entitled "Providing Social Endorsements with Online Advertising" and filed 5 Oct. 2010 as U.S. patent application Ser. No. 12/898,662, and in U.S. Patent Application Publication No. 2012/0232998, entitled "Selecting Social Endorsement Information for an Advertisement for Display to a Viewing User" and filed 8 Mar. 2011 as U.S. patent application Ser. No. 13/043,424, which are both incorporated herein by reference as examples only and not by way of limitation. Interacting with an advertisement that is associated with social-networking-system functionality or content may cause information about the interaction to be displayed in a profile page of the user in social-networking-system 360.

Particular embodiments may facilitate the delivery of advertisements to users that are more likely to find the advertisements more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 360 to identify those users. In addition or as an alternative, social-networking system 360 may use user-profile information in social-networking system 360 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 360, off or outside of social-networking system 360, or on mobile computing devices of users. When on or within social-networking system 360, such targeting may be directed to users' news feeds, search results, e-mail or other in-boxes, or notifications channels or may appear in particular area of web pages of social-networking system 360, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 360, such targeting may be provided through a third-party website, e.g., involving an ad exchange or a social plug-in. When on a mobile computing device of a user, such targeting may be provided through push notifications to the mobile computing device.

Targeting criteria used to identify and target users may include explicit, stated user interests on social-networking system 360 or explicit connections of a user to a node, object, entity, brand, or page on social-networking system 360. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples and not by way of limitation: U.S. Patent Application Publication No. 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. 2009/0070219, entitled "Targeting Advertisements in a Social Network" and filed 20 Aug. 2008 as U.S. patent application Ser. No. 12/195,321; U.S. Patent Application Publication No. 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Application Publication No. 2012/0166532, entitled "Contextually Relevant Affinity Prediction in a Social-Networking System" and filed 23 Dec. 2010 as U.S. patent application Ser. No. 12/978,265.

An advertisement may be presented or otherwise delivered using plug-ins for web browsers or other applications, iframe elements, news feeds, tickers, notifications (which may include, for example, e-mail, Short Message Service (SMS) messages, or notifications), or other means. An advertisement may be presented or otherwise delivered to a user on a mobile or other computing device of the user. In connection with delivering advertisements, particular embodiments may utilize one or more systems, components, elements, functions, methods, operations, or steps disclosed in the following, which are all incorporated herein by reference as examples and not by way of limitation: U.S. Patent Application Publication No. 2012/0159635, entitled "Comment Plug-In for Third-Party System" and filed 15 Dec. 2010 as U.S. patent application Ser. No. 12/969,368; U.S. Patent Application Publication No. 2012/0158753, entitled "Comment Ordering System" and filed 15 Dec. 2010 as U.S. patent application Ser. No. 12/969,408; U.S. Pat. No. 7,669,123, entitled "Dynamically Providing a News Feed About a User of a Social Network" and filed 11 Aug. 2006 as U.S. patent application Ser. No. 11/503,242; U.S. Pat. No. 8,402,094, entitled "Providing a Newsfeed Based on User Affinity for Entities and Monitored Actions in a Social Network Environment" and filed 11 Aug. 2006 as U.S. patent application Ser. No. 11/503,093; U.S. Patent Application Publication No. 2012/0072428, entitled "Action Clustering for News Feeds" and filed 16 Sep. 2010 as U.S. patent application Ser. No. 12/884,010; U.S. Patent Application Publication No. 2011/0004692, entitled "Gathering Information about Connections in a Social Networking Service" and filed 1 Jul. 2009 as U.S. patent application Ser. No. 12/496,606; U.S. Patent Application Publication No. 2008/0065701, entitled "Method and System for Tracking Changes to User Content in an Online Social Network" and filed 12 Sep. 2006 as U.S. patent application Ser. No. 11/531,154; U.S. Patent Application Publication No. 2008/0065604, entitled "Feeding Updates to Landing Pages of Users of an Online Social Network from External Sources" and filed 17 Jan. 2007 as U.S. patent application Ser. No. 11/624,088; U.S. Pat. No. 8,244,848, entitled "Integrated Social-Network Environment" and filed 19 Apr. 2010 as U.S. patent application Ser. No. 12/763,171; U.S. Patent Application Publication No. 2011/0083101, entitled "Sharing of Location-Based Content Item in Social-Networking Service" and filed 6 Oct. 2009 as U.S. patent application Ser. No. 12/574,614; U.S. Pat. No. 8,150,844, entitled "Location Ranking Using Social-Graph Information" and filed 18 Aug. 2010 as U.S. patent application Ser. No. 12/858,718; U.S. patent application Ser. No. 13/051,286, entitled "Sending Notifications to Users Based on Users' Notification Tolerance Levels" and filed 18 Mar. 2011; U.S. patent application Ser. No. 13/096,184, entitled "Managing Notifications Pushed to Mobile devices" and filed 28 Apr. 2011; U.S. patent application Ser. No. 13/276,248, entitled "Platform-Specific Notification Delivery Channel" and filed 18 Oct. 2011; or U.S. Patent Application Publication No. 2012/0197709, entitled "Mobile Advertisement with Social Component for Geo-Social Networking System" and filed 1 Feb. 2011 as U.S. patent application Ser. No. 13/019,061. Although this disclosure describes or illustrates particular advertisements being delivered in particular ways and in connection with particular content, this disclosure contemplates any suitable advertisements delivered in any suitable ways and in connection with any suitable content.

In particular embodiments, social-networking system 360 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 370 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 360 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of an observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 360 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 360 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 360 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 360 may calculate a coefficient based on a user's actions. Social-networking system 360 may monitor such actions on the online social network, on a third-party system 370, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 360 may calculate a coefficient based on the user's actions with particular types of content. The content may be associated with the online social network, a third-party system 370, or another suitable system. The content may include users, profile pages, posts, news stories, headlines, instant messages, chat room conversations, emails, advertisements, pictures, video, music, other suitable objects, or any combination thereof. Social-networking system 360 may analyze a user's actions to determine whether one or more of the actions indicate an affinity for subject matter, content, other users, and so forth. As an example and not by way of limitation, if a user may make frequently posts content related to "coffee" or variants thereof, social-networking system 360 may determine the user has a high coefficient with respect to the concept "coffee". Particular actions or types of actions may be assigned a higher weight and/or rating than other actions, which may affect the overall calculated coefficient. As an example and not by way of limitation, if a first user emails a user, the weight or the rating for the action may be higher than if the first user simply views the user-profile page for the user.

In particular embodiments, social-networking system 360 may calculate a coefficient based on the type of relationship between particular objects. Referencing the social graph 400, social-networking system 360 may analyze the number and/or type of edges 406 connecting particular user nodes 402 and concept nodes 404 when calculating a coefficient. As an example and not by way of limitation, user nodes 402 that are connected by a spouse-type edge (representing that the two users are married) may be assigned a higher coefficient than a user node 402 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 360 may determine that the user has a higher coefficient with respect to the first photo than the second photo because having a tagged-in-type relationship with content may be assigned a higher weight and/or rating than having a like-type relationship with content. In particular embodiments, social-networking system 360 may calculate a coefficient for a first user based on the relationship one or more users have with a particular object. In other words, the connections and coefficients other users have with an object may affect the first user's coefficient for the object. As an example and not by way of limitation, if a first user is connected to or has a high coefficient for one or more users, and those users are connected to or have a high coefficient for a particular object, social-networking system 360 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 400. As an example and not by way of limitation, social-graph entities that are closer in the social graph 400 (i.e., fewer degrees of separation) may have a higher coefficient than entities that are further apart in the social graph 400.

In particular embodiments, social-networking system 360 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 330 of the user). A first user may be more interested in other users or concepts that are closer to the first user. As an example and not by way of limitation, if a user is one mile from an airport and two miles from a gas station, social-networking system 360 may determine that the user has a higher coefficient for the airport than the gas station based on the proximity of the airport to the user.

In particular embodiments, social-networking system 360 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 360 may provide information that is relevant to user's interests and current circumstances, increasing the likelihood that they will find such information of interest. In particular embodiments, social-networking system 360 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 360 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 360 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 370 (e.g., via an API or other communication channel), or from another suitable system. In response to the request, social-networking system 360 may calculate the coefficient (or access the coefficient information if it has previously been calculated and stored). In particular embodiments, social-networking system 360 may measure an affinity with respect to a particular process. Different processes (both internal and external to the online social network) may request a coefficient for a particular object or set of objects. Social-networking system 360 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) may be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element may be accessed using the online social network. As an example and not by way of limitation, a particular concept node 404 corresponding to a particular photo may have a privacy setting specifying that the photo may only be accessed by users tagged in the photo and their friends. In particular embodiments, privacy settings may allow users to opt in or opt out of having their actions logged by social-networking system 360 or shared with other systems (e.g., third-party system 370). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 370, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers of the social-networking system 360 may be authorization/privacy servers for enforcing privacy settings. In response to a request from a user (or other entity) for a particular object stored in a data store, social-networking system 360 may send a request to the data store for the object. The request may identify the user associated with the request and may only be sent to the user (or a client system 330 of the user) if the authorization server determines that the user is authorized to access the object based on the privacy settings associated with the object. If the requesting user is not authorized to access the object, the authorization server may prevent the requested object from being retrieved from the data store or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

In particular embodiments, one or more objects (e.g., content or other types of objects) of a computing system may be associated with one or more privacy settings. The one or more objects may be stored on or otherwise associated with any suitable computing system or application, such as, for example, a social-networking system 360, a client system 330, a third-party system 370, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) may be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element may be accessed using the online social network. As an example and not by way of limitation, a particular concept node 404 corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system 360 or shared with other systems (e.g., a third-party system 370). Although this disclosure describes using particular privacy settings in a particular manner, this disclosure contemplates using any suitable privacy settings in any suitable manner.

In particular embodiments, privacy settings may be based on one or more nodes or edges of a social graph 400. A privacy setting may be specified for one or more edges 406 or edge-types of the social graph 400, or with respect to one or more nodes 402, 204 or node-types of the social graph 400. The privacy settings applied to a particular edge 406 connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system 360. The object may be associated with a concept node 404 connected to a user node 402 of the first user by an edge 406. The first user may specify privacy settings that apply to a particular edge 406 connecting to the concept node 404 of the object or may specify privacy settings that apply to all edges 406 connecting to the concept node 404. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system 360 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system 360 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems 370, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers of the social-networking system 360 may be authorization/privacy servers for enforcing privacy settings. In response to a request from a user (or other entity) for a particular object stored in a data store of the social-networking system 360, the social-networking system 360 may send a request to the data store for the object. The request may identify the user associated with the request and the object may be sent only to the user (or a client system 330 of the user) if the authorization server determines that the user is authorized to access the object based on the privacy settings associated with the object. If the requesting user is not authorized to access the object, the authorization server may prevent the requested object from being retrieved from the data store or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user or may be the particular user's account or information stored on the social-networking system 360, or other computing system. As an example and not by way of limitation, a first user may view one or more users of an online social network through a "People You May Know" function of the online social network, or by viewing a list of friends of the first user. As an example and not by way of limitation, a first user may specify that they do not wish to see objects associated with a particular user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system 360 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system 360 may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system 360 may access such information in order to provide a particular function or service to the first user, without the social-networking system 360 having access to that information for any other purposes. Before accessing, storing, or using such objects or information, the social-networking system 360 may prompt the user to provide privacy settings specifying which applications or processes, if any, may access, store, or use the object or information prior to allowing any such action. As an example and not by way of limitation, a first user may transmit a message to a user via an application related to the online social network (e.g., a messaging app), and may specify privacy settings that such messages should not be stored by the social-networking system 360.

In particular embodiments, a user may specify whether particular types of objects or information associated with the first user may be accessed, stored, or used by the social-networking system 360. As an example and not by way of limitation, the first user may specify that images sent by the first user through the social-networking system 360 may not be stored by the social-networking system 360. As another example and not by way of limitation, a first user may specify that messages sent from the first user to a particular user may not be stored by the social-networking system 360. As yet another example and not by way of limitation, a first user may specify that all objects sent via a particular application may be saved by the social-networking system 360.

In particular embodiments, privacy settings may allow a first user to specify whether particular objects or information associated with the first user may be accessed from particular client systems 330 or third-party systems 370. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system 360 may provide default privacy settings with respect to each device, system, or application, and/or the first user may be prompted to specify a particular privacy setting for each context. As an example and not by way of limitation, the first user may utilize a location-services feature of the social-networking system 360 to provide recommendations for restaurants or other places in proximity to the user. The first user's default privacy settings may specify that the social-networking system 360 may use location information provided from a client device 330 of the first user to provide the location-based services, but that the social-networking system 360 may not store the location information of the first user or provide it to any third-party system 370. The first user may then update the privacy settings to allow location information to be used by a third-party image-sharing application in order to geo-tag photos.

In particular embodiments, privacy settings may allow a user to specify one or more geographic locations from which objects may be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to users only while the first user is in a particular location. If the first user leaves the particular location, the object may no longer be visible to the users. As another example and not by way of limitation, a first user may specify that an object is visible only to users within a threshold distance from the first user. If the first user subsequently changes location, the original users with access to the object may lose access, while a new group of users may gain access as they come within the threshold distance of the first user.

Figure 5:
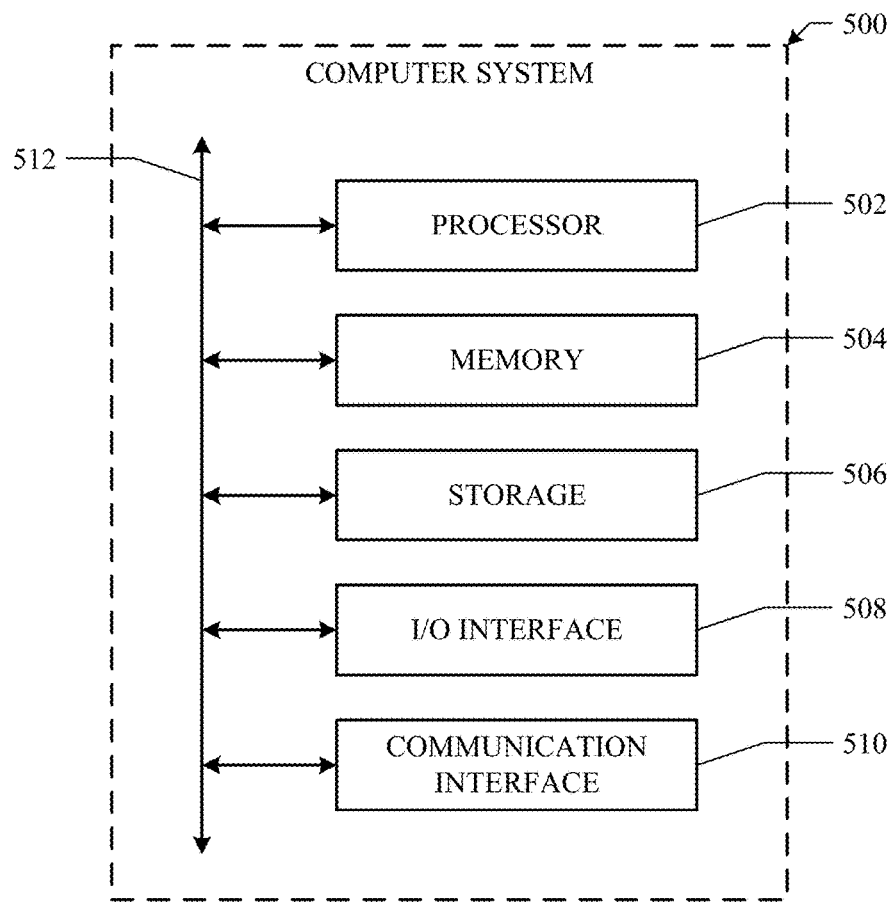
FIG. 5 illustrates an example computer system in particular embodiments.

FIG. 5 illustrates an example computer system 500 in particular embodiments. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
by a computer server machine, receiving recorded signals from a first mobile device with respect to a bounded area comprising a plurality of sampling locations, the signal information comprising a list of detected signals and a signal strength value for each of the detected signals at the sampling location, wherein the sampled signals are transmitted by a plurality of fixed-location signal sources within the bounded area;
by the computer server machine, determining a location of each of the signal sources;
by the computer server machine, receiving image data captured by the first mobile device;
by the computer server machine, calibrating, using the image data, the determined locations of the signal sources;
by the computer server machine, generating a spatial distribution of signal strength values within the bounded area with respect to each of the detected signals and the determined locations of the signal sources;
by the computer server machine, creating a signal-location mapping of the spatial distribution of signal strength values to locations within the bounded area;
by the computer server machine, in response to a location request from a second mobile device, wherein the location request includes a list of detected signals at a particular location within the bounded area and signal strength values for each of the detected signals, identifying the particular location based on the signal-location mapping; and
by the computer server machine, providing to the second mobile device a response to the location request, wherein the response comprises information associated with the particular location.

2. The method of claim 1, further comprising:
receiving motion data detected by the first mobile device, wherein the motion data is detected by various motion sensors including one or more of a compass, an accelerometer, an altimeter, a camera sensor, and a gyroscope; and
calibrating, using the motion data, the determined locations of the signal sources.

3. The method of claim 2, wherein the determining a location of each of the signal sources comprises generating an area map of the bounded area based on the motion data.

4. The method of claim 1, further comprising:
receiving location information for locations mapped to the spatial distribution of signal strength values; and
indexing the location information based on the signal-location mapping.

5. The method of claim 1, wherein the generating the spatial distribution of signal strength values within the bounded area with respect to each of the detected signals and the determined locations of the signal sources further comprises, for each of the signals detected within the bounded area:
interpolating, between adjacent sampling locations, signal strength values for the signal that were detected at the adjacent sampling locations;
interpolating signal strength values between the determined location of the signal source for the detected signal and the nearest sampling locations; or
applying a smoothing algorithm with respect to the signal strength values across some or all of the sampling locations.

6. The method of claim 1, further comprising:
receiving signal information from user client devices sampling signals within the bounded area; and
updating the signal-location mapping based on the received signal information.

7. The method of claim 1, wherein the spatial distribution of signal strength values is weighted in accordance with physical attributes of the mobile computing device.

8. The method of claim 1, further comprising:
expiring a signal from the signal-location mapping when the signal is not detected by any user client device for a predetermined duration of time.

9. The method of claim 8, further comprising:
restoring the expired signal in the signal-location mapping when the signal is subsequently detected by a user client device.

10. A computer server machine comprising: one or more processors; and a memory coupled to the processors comprising instructions executable by the processors, the processors being operable when executing the instructions to:

receive, from a first mobile device, recorded signal information detected at each of a plurality of sampling locations within a bounded area, the signal information comprising a list of detected signals and a signal strength value for each of the detected signals at the sampling location, wherein the sampled signals are transmitted by a plurality of fixed-location signal sources within the bounded area;

determine a location of each of the signal sources;

receive image data captured by the first mobile device;

calibrate, using the image data, the determined locations of the signal sources;

generate a spatial distribution of signal strength values within the bounded area with respect to each of the detected signals and the determined locations of the signal sources;

create a signal-location mapping of the spatial distribution of signal strength values to locations within the bounded area;

in response to a location request from a second mobile device, the location request including a list of detected signals at a particular location within the bounded area and signal strength values for each of the detected signals, identify the particular location based on the signal-location mapping; and provide, to the second mobile device, a response to the location request, wherein the response comprises information associated with the particular location.

11. The computer server machine of claim 10, the processors being further operable when executing the instructions to:

receive, from the first mobile device, motion data for the first mobile device detected while traversing the bounded area, wherein the motion data is detected by various motion sensors including one or more of a compass, an accelerometer, an altimeter, a camera sensor, and a gyroscope; and calibrate, using the motion data, the determined locations of the signal sources.

12. The computer server machine of claim 11, wherein the instructions to determine a location of each of the signal sources comprises instructions to generate an area map of the bounded area based on the motion data.

13. The computer server machine of claim 10, the processors being further operable when executing the instructions to:

receive location information for locations mapped to the spatial distribution of signal strength values; and index the location information based on the signal-location mapping.

14. The computer server machine of claim 10, wherein the instructions to generate the spatial distribution of signal strength values within the bounded area with respect to each of the detected signals and the determined locations of the signal sources further comprises instructions to, for each of the signals detected within the bounded area:

interpolate, between adjacent sampling locations, signal strength values for the signal that were detected at the adjacent sampling locations;

interpolate signal strength values between the determined location of the signal source for the detected signal and the nearest sampling locations; or apply a smoothing algorithm with respect to the signal strength values across some or all of the sampling locations.

15. The computer server machine of claim 10, the processors being further operable when executing the instructions to:

receive signal information from user client devices sampling signals within the bounded area; and update the signal-location mapping based on the received signal information.

16. The computer server machine of claim 10, wherein the spatial distribution of signal strength values is weighted in accordance with physical attributes of the mobile computing device.

17. The computer server machine of claim 10, the processors being further operable when executing the instructions to:

expire a signal from the signal-location mapping when the signal is not detected by any user client device for a predetermined duration of time.

18. The computer server machine of claim 17, the processors being further operable when executing the instructions to:

restore the expired signal in the signal-location mapping when the signal is subsequently detected by a user client device.

19. One or more computer-readable non-transitory storage media embodying software that is operable when executed to:

receive, from a first mobile device, recorded signal information detected at each of a plurality of sampling locations within a bounded area, the signal information comprising a list of detected signals and a signal strength value for each of the detected signals at the sampling location, wherein the sampled signals are transmitted by a plurality of fixed-location signal sources within the bounded area;

determine a location of each of the signal sources;

receive image data captured by the first mobile device;

calibrate, using the image data, the determined locations of the signal sources;

generate a spatial distribution of signal strength values within the bounded area with respect to each of the detected signals and the determined locations of the signal sources;

create a signal-location mapping of the spatial distribution of signal strength values to locations within the bounded area;

in response to a location request from a second mobile device, the location request including a list of detected signals at a particular location within the bounded area and signal strength values for each of the detected signals, identify the particular location based on the signal-location mapping; and provide, to the second mobile device, a response to the location request, wherein the response comprises information associated with the particular location.

20. The computer-readable non-transitory storage media of claim 19, the software being further operable when executed to:

receive, from the first mobile device, motion data for the first mobile device detected while traversing the bounded area, wherein the motion data is detected by various motion sensors including one or more of a compass, an accelerometer, an altimeter, a camera sensor, and a gyroscope; and calibrate, using the motion data, the determined locations of the signal sources.

* * * * *